July 3, 1934.  L. E. W. VAN ALBADA  1,964,967
RANGEFINDER FOR PHOTOGRAPHIC PURPOSES
Filed April 6, 1933
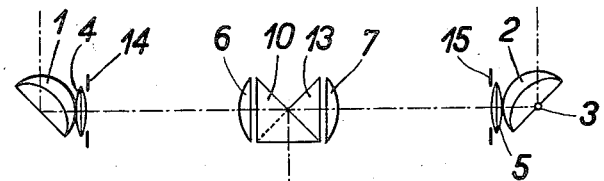
Fig.1
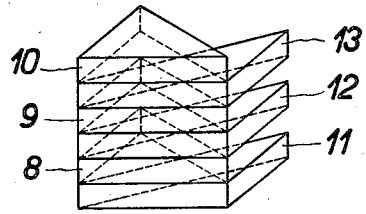
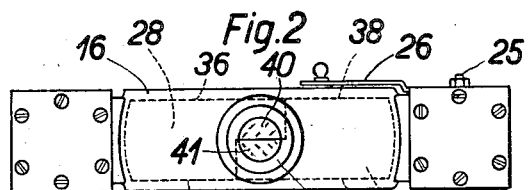
Fig.3
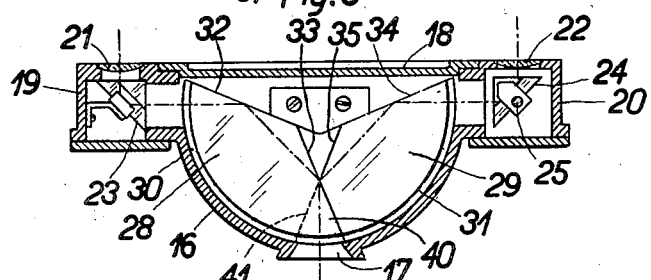
Fig.4
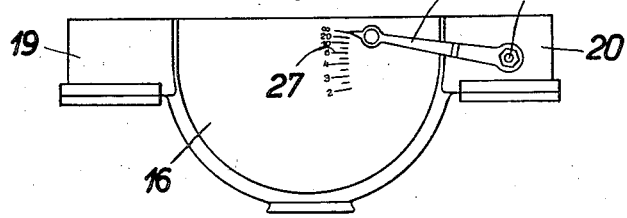
Fig.5
Inventor:
L.E.W. van Albada Patented July 3, 1934

1,964,967

UNITED STATES PATENT OFFICE 1,964,967

RANGEFINDER FOR PHOTOGRAPHIC PURPOSES

Lieuwe E. W. Van Albada, Bloemendaal, Netherlands, assignor to the firm Carl Zeiss, Jena, Germany Application April 6, 1933, Serial No. 664,786
In Germany April 6, 1932

6 Claims. (Cl. 88—2.7)

I have filed an application in Germany, April 6, 1932, of which the following is a specification:

If, with a view to obtaining the best possible reproduction of the telescope image, rangefinders for photographical purposes consisting of two telescope systems were equipped with the usual magnifying telescope systems, only part of the image section reproduced in the image plane of a photographic camera by means of a certain photographic objective would appear in the image field of the rangefinder, and this because, obviously, the instrument may not be given very great exterior dimensions and the field of view of the oculars would be far too great. For this reason it would not be possible to examine the real size of the image section in the rangefinder, the consequence being that a frosted disc or a special finder would have to be used.

The invention, which concerns a rangefinder of this kind, avoids the said disadvantages by using telescope objectives whose focal lengths have absolute values inferior or, at most, equal to those of the focal lengths of the telescope oculars. It is of no importance whether the telescopes are astronomical or Galilean. When using telescope systems which have converging objectives and, accordingly, produce real images of the viewed object, the rangefinder will permit an exact determination of the image section to be photographed. This advantage is obtained by providing in the image plane of at least the one telescope a diaphragm the aperture of which corresponds to the image section produced by the used photographic objective in the image plane of the used photographic camera. The observer is presented not only the view of the object but also that of the diaphragm corresponding to the image section. Owing to the coincidence of the image of the object with the plane of the diaphragm, no parallax will arise. When using monocular rangefinders having a mirror system combining the imaging rays, it is specially advisable to provide that each of the telescope images in the two oculars covers all of the ocular field of view, that is to say to use rangefinders in which the images cover each other. This kind of rangefinders, when compared to other rangefinders, e. g. coincidence rangefinders, offers the advantage that the viewed image is not interrupted by any division line.

The accompanying drawing, which illustrates the invention, represents two constructional examples that are specially advantageous on account of their simplicity. Figure 1 shows the first example, a monocular rangefinder, schematically in plan view. Figure 2 illustrates on an enlarged scale, and in a perspective view, the prism system used in the said rangefinder for combining the imaging rays. Figure 3 shows the second constructional example, also a monocular rangefinder, in elevation. Figures 4 and 5 represent this second example in cross section and in top view, respectively.

The rangefinder according to the first example (Figure 1) consists of two telescope systems with converging objectives and a prism system for combining the imaging rays. The objectives are composed of two members each, the front members 1 and 2 representing quarters of a globe. Accordingly, each of these two members 1 and 2 is bounded by two semicircular plane surfaces at right angles to each other and the quarter of a globe surface. The globe quarters 1 and 2 are so disposed that the edge in which the two semicircular surfaces intersect is inclined at 45° relatively to the rangefinder base and that the two semicircular surfaces represent a roof-surface reflector deviating the entering light rays at right angles so as to make them parallel to the base, the consequence being a reversion of height. The globe quarter 2 is rotatable about an axle 3 intersecting the globe centre at right angles to the roof edge. Immediately behind the members 1 and 2 are disposed converging lenses 4 and 5, respectively. The telescope oculars are represented by converging lenses 6 and 7 of a comparatively great focal length. The imaging rays emanating from the oculars are deviated by the said prism system at right angles into the viewing direction. The prism system (Figure 2) consists of three narrow triangular prisms 8, 9 and 10 belonging to the left telescope system, and three triangular prisms 11, 12, 13 belonging to the telescope system at the right. The prisms of these two systems, which are equal, are placed one above each other in the manner illustrated in Figure 2, the light exit surfaces represented by the cathete surfaces lying in one common plane.

When using the rangefinder, the imaging rays entering the members 1 and 2 by way of the globe surfaces are reflected by the two roof surfaces and, subsequently, refracted by the two globe surfaces and the rear members 4 and 5, these rays being thus converged so as to form reduced real images of the object. These reduced images lie in planes closely behind the objectives and containing diaphragms 14 and 15. Consequently, the focal lengths of the objectives 1, 4 and 2, 5 are comparatively short. The apertures of the diaphragms 14 and 15 are so dimensioned that each diaphragm delimits an image section corresponding to the one reproduced by the objective of a photographic camera to be used together with the rangefinder. The diaphragm apertures and the images appearing therein are viewed by the observer through the oculars 6 and 7, the prism system consisting of the prisms 8, 9, 10, 11, 12 and 13 representing simultaneously two images covering each other. By turning the globe quarter 2 about its axle 3, the parallax arising between the two images is made to disappear for an object to be photographed. By means of the adjustment which the globe quarter 2 has when the images covering each other are without parallax, the distance of the object aimed at may be determined in any known manner, for instance by using an index and a scale divided accordingly.

The second constructional example (Figures 3 to 5) has a housing 16 with an ocular aperture 17 and a cover 18. At the two ends of the housing 16 are provided prism housings 19 and 20, respectively, having ray entrance apertures in which objectives 21 and 22 are mounted. In the prism housing 19 is fixedly mounted a triangular prism 23 with an image-reversing roof, and the prism housing 20 contains a corresponding prism 24 which is rotatable about an axle 25 at right angles to the roof edge. The axle 25 bears an index 26 extending from the housing 20 and cooperating with a scale 27 provided on the housing 16, this scale representing ranges. The two oculars as well as the two prism systems combining the imaging rays lie in the housing 16 and consist of two equal glass bodies 28 and 29. These glass bodies are bounded, respectively by parts 30 and 31 of a globe surface, two reflecting surfaces 32, 33 and 34, 35, and two plane parallel surfaces 36, 37 and 38, 39 without any optical effect. Parts 40 and 41 of the two glass bodies 28 and 29, respectively, cover each other in such a manner that a horizontal division line appears in front of the aperture 17. The two reflecting surfaces 32 and 34 are inclined at angles of 22½° relatively to the rangefinder base. The reflecting surfaces 33, 35 and 32, 34, respectively, embrace angles of 135°. Each two of the reflecting surfaces 32, 33 and 34, 35 deviate the incident ray pencils at right angles, giving them the light exit direction that is common to the two bodies 28 and 29 and, accordingly, inclined at angles of 22½° relatively to the reflecting surfaces 33 and 35. The focal lengths of the objectives and oculars are equal, the telescopic magnification consequently being equal to 1.

When using the instrument, the observer at the aperture 17 is offered the view of two telescope images of the object which cover each other. As with the first example, the parallax between the two images is removed by rotating the prism 24 about its axle 25, the index 26 indicating the object distance on the scale 27. To provide for a common adjustment, the prism 24 may be connected to the objective of the photographic camera in the known manner

I claim:

1. A rangefinder for photographic purposes, consisting of two telescope systems and a reflecting system, the absolute value of the focal length of the telescope objectives being inferior or, at most, equal to that of the focal length of the telescope oculars.

2. A rangefinder for photographic purposes, consisting of two telescope systems and a reflecting system, the telescope objectives being convergent and the absolute value of their focal length being inferior or, at most, equal to that of the focal length of the telescope oculars, a diaphragm being disposed in the image plane of at least one of the telescopes, this diaphragm being adapted to restrict the image section.

3. A rangefinder for photographic purposes, consisting of two telescope systems and a reflecting system, the telescope objectives being convergent and consisting of two members touching each other at least approximately, the refracting surfaces of the front member of the objectives belonging to one common globe surface, and the absolute value of the focal length of the objectives being inferior or, at most, equal to that of the focal length of the oculars.

4. A rangefinder for photographic purposes, having two converging objectives, a prism system disposed behind the two objectives and adapted to so receive the two images of an object which are projected by the objectives that they cover each other, and an ocular disposed behind the said prism system, the absolute value of the focal length of the objectives being inferior or, at most, equal to that of the focal length of the ocular.

5. A rangefinder for photographic purposes, having two converging objectives, two prisms, these prisms being adapted to so receive the two images of an object which are projected by the objectives that they cover each other, and an ocular disposed behind the said prisms, the absolute value of the focal length of the objectives being inferior or, at most, equal to that of the focal length of the ocular.

6. In a rangefinder according to claim 5, the said two prisms forming a glass body, all of the refracting surfaces of this body belonging to one and the same spherical surface.

LIEUWE E. W. VAN ALBADA.